United States Patent [19]

Glasson et al.

[11] 4,282,960
[45] Aug. 11, 1981

[54] VISCOUS FLUID CLUTCH

[75] Inventors: Richard E. Glasson; Jerre F. Lauterbach, both of Columbus, Ind.

[73] Assignee: Cummins Engine Company, Columbus, Ind.

[21] Appl. No.: 46,942

[22] Filed: Jun. 8, 1979

[51] Int. Cl.³ .................. F16D 35/00; F16D 43/25
[52] U.S. Cl. ............................ 192/58 C; 192/82 T
[58] Field of Search ..................... 192/58 C, 82 T

[56] References Cited

U.S. PATENT DOCUMENTS

| Re. 24,157 | 5/1956 | Johnson | 192/58 C |
| Re. 25,481 | 11/1963 | Weir | 192/58 C X |
| 2,320,900 | 6/1943 | Waltz | 192/82 T |
| 2,570,515 | 10/1951 | Bonham | 192/41 |
| 2,988,188 | 6/1961 | Tauschek | 192/82 T |
| 3,019,875 | 2/1962 | Fowler | 192/58 C |
| 3,261,230 | 7/1966 | Rudnicki | 74/710.5 |
| 3,396,909 | 8/1968 | Seifert | 192/82 T |
| 3,485,444 | 12/1969 | Linzenkirchner | 230/271 |
| 3,730,151 | 5/1973 | Smith | 123/41.12 |
| 3,739,891 | 6/1973 | La Flame | 192/58 C |
| 3,893,555 | 7/1975 | Elmer | 192/58 B |
| 3,913,713 | 10/1975 | F'Geppert | 192/70.25 |
| 4,060,158 | 11/1977 | Kikuchi | 192/82 T |

Primary Examiner—Allan D. Herrmann
Attorney, Agent, or Firm—Neuman, Williams, Anderson & Olson

[57] ABSTRACT

A viscous fluid clutch is provided which embodies first, second and third drive members rotatable about a common axis. The second drive member is provided with an internal chamber in which both the first and third drive members are disposed. A predetermined amount of viscous fluid is disposed within the chamber. The third drive member is positioned between the first drive member and a chamber-forming wall of the second drive member. The second and third drive members rotate as a unit and the third drive member is movable axially independently of said second drive member. Corresponding surfaces of the first and third drive members form therebetween an annular fluid shear space concentric with the rotary axis of the drive members. The chamber-forming wall of the second drive member is provided with a thermal-responsive membrane having a segment thereof independently movable axially of the first drive member in response to predetermined ambient temperature changes. Axial movement of the membrane effects axial movement of the third drive member and varies the configuration of the annular fluid shear space. All of the drive members are adapted to rotate as a unit when the first and third drive members are in closest axial proximity and the annular fluid shear space is substantially filled with the viscous fluid.

6 Claims, 3 Drawing Figures

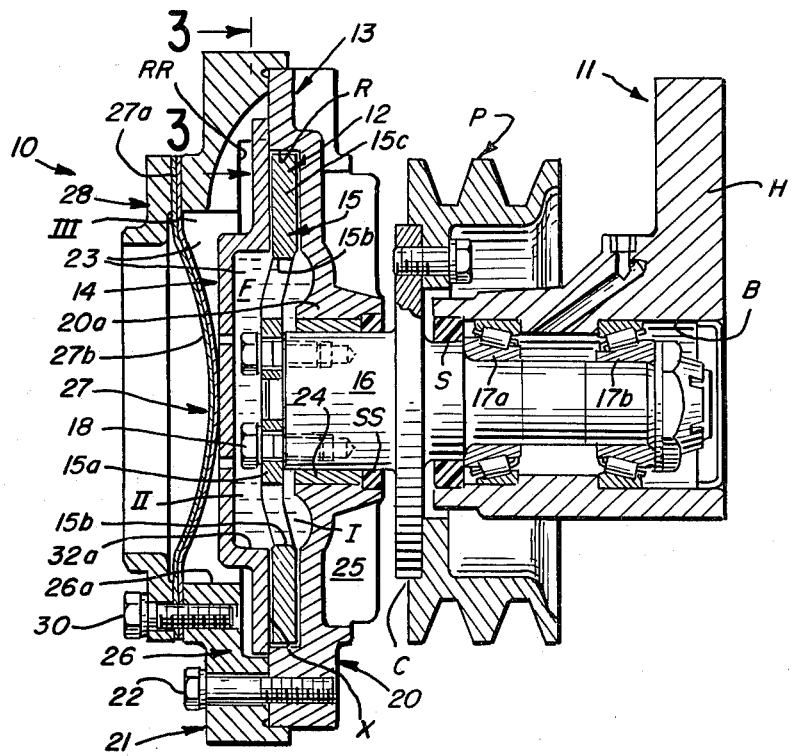
FIG. 1
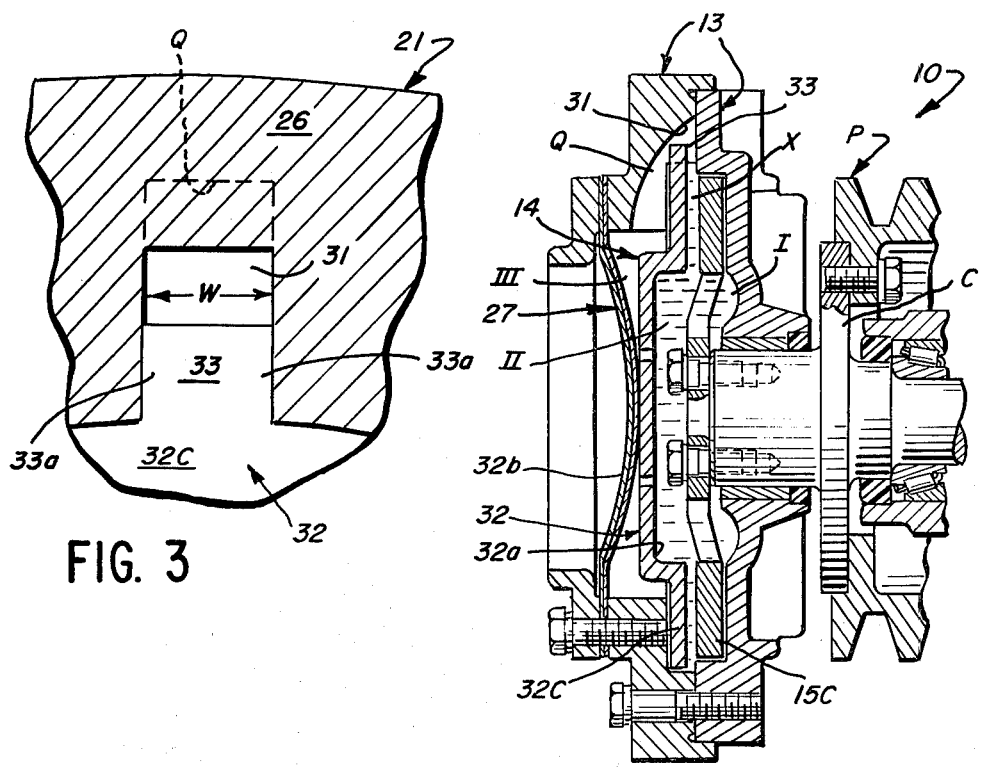
FIG. 3
FIG. 2

VISCOUS FLUID CLUTCH

BACKGROUND OF THE INVENTION

Various viscous fluid clutches have heretofore been provided; however, because of certain design characteristics they are beset with one or more of the following shortcomings: (a) the clutch is of complex costly construction; (b) the clutch is susceptible to an inordinate amount of servicing and maintenance; and (c) the relative rotational speed of various drive members embodied in the clutch cannot be readily modulated in response to various ambient temperature changes.

SUMMARY OF THE INVENTION

Thus, it is an object of the invention to provide a viscous fluid clutch which avoids the aforenoted shortcomings besetting prior clutches of this general type.

It is a further object of the invention to provide a viscous fluid clutch which is particularly suitable for use with a cooling fan for an internal combustion engine.

Further and additional objects will appear from the description, accompanying drawing, and appended claims.

In accordance with one embodiment of the invention a viscous fluid clutch is provided which comprises first, second and third drive members, all rotatable about a common axis. The second drive member is provided with an internal chamber in which the first and third drive members are disposed. A predetermined amount of viscous fluid is accommodated within the chamber. The third drive member is disposed between the first drive member and a chamber-forming wall of the second drive member. The second and third drive members can only rotate as a unit; however, the third member can move axially independently of the second drive member. The first and third drive members are provided with corresponding surfaces which are adapted to coact to form therebetween an annular fluid shear space which is concentric with the rotary axis. The chamber-forming wall of the second drive member includes a thermal-responsive membrane having a segment thereof independently movable axially of the first drive member in response to predetermined ambient temperature changes. Axial movement of the membrane segment produces axial movement of the third drive member and thus varies the configuration of the fluid shear space. All the drive members rotate as a unit when the first and third drive members are in the closest axial proximity and the fluid shear space is substantially filled with the viscous fluid.

DESCRIPTION

For a more complete understanding of the invention, reference should be made to the drawing wherein:

FIG. 1 is a fragmentary vertical sectional view of one form of the improved clutch with the first and third drive members thereof in their closest axial proximity whereby maximum clutching action occurs between the drive members; the plane of section includes the rotary axis of the drive members.

FIG. 2 is a fragmentary vertical sectional view similar to FIG. 1 but showing the first and third drive members thereof axially spaced apart their greatest extent whereby no clutching action occurs between the drive members.

FIG. 3 is a fragmentary sectional view taken along line 3-3 of FIG. 1.

The improved clutch embodiment 10 shown in FIGS. 1 and 2 is particularly suitable for use with a cooling fan, not shown, for an internal combustion engine 11. It is to be understood, of course, that the improved clutch, hereinafter described, is not intended to be limited thereto.

Clutch 10 basically comprises three drive members 12, 13 and 14. Drive member 12 includes a clutch disc or plate 15 which is fixedly mounted on a shaft 16. The shaft, as shown in FIG. 1, is rotatably supported by the engine housing H through a pair of conventional, axially spaced tapered bearings 17a, 17b which are mounted within a bore B formed in the engine housing. The bearings are suitably lubricated and an appropriate seal S is provided at the end of the bore from which the shaft extends. The protruding portion of shaft 16 has affixed thereto a radially extending collar C on which is secured a pulley P. The pulley is engaged by one or more drive belts, not shown, which transmit power from the engine to the shaft.

The hub or central portion 15a of disc 15 is secured to the protruding end of shaft 16 by a plurality of anchor bolts 18. Spaced radially outwardly from hub 15a are a plurality of symmetrically arranged openings or ports 15b, the function of which will be described more fully hereinafter.

The second drive member 13 is formed of two complemental sections 20, 21 which have the outer peripheral portions thereof secured to one another in sealed face-to-face relation by a plurality of symmetrically arranged bolts 22. The sections 20, 21 coact with one another to form an internal chamber 23 in which is disposed a predetermined volume of viscous fluid F.

As seen in FIG. 1, section 20 is provided with a hub 20a which surrounds a segment of the protruding shaft portion which is disposed between the collar C and disc 15. The hub 20a is provided with a suitable bushing 24 and a seal SS at the exposed end of the hub. The interior surface of section 20—that is the surface facing section 21—is provided with an annular recess R which is shaped to accommodate an outer peripheral or rim portion 15c of the disc 15. The exterior of section 20, if desired, may be provided with a plurality of cooling fins 25.

The other complemental section 21 includes an inner unit 26 which is provided with an enlarged central opening 26a which is concentric with the rotary axis. The end of opening 26a which faces the first drive member 12 is countersunk so as to form a recess RR which is adapted to accommodate the outer peripheral portion of the third drive member 14 as will be described more fully hereinafter.

Secured to and closing the outer or exposed end of opening 26a is an imperforate thermal-responsive membrane 27. The membrane may be of a bimetal construction and has a rim portion 27a which is sandwiched between a ringlike outer unit 28 and the inner unit 26. A plurality of symmetrically arranged bolts 30 hold the unit 28 in place.

The rim portion 27a encompasses a central portion 27b of the member 27 which preferably has a concavo-convex, or dome, configuration. The convex surface of the central portion 27b forms a wall of the internal chamber 23, see FIG. 1. Because the central portion 27b is exposed to ambient temperature, it will move axially relative to drive member 12 and the inner and outer units 26, 28 of drive member 13 in response to predetermined changes in the ambient temperature.

Symmetrically disposed about the periphery of recess RR are a plurality of pockets 31, see FIGS. 1 and 3. The function of these pockets will become apparent from the discussion hereinafter.

As previously noted, third drive member 14 is disposed within the internal chamber 23 of the second drive member 13 and coacts with the disc 15 to form the chamber 23 into a plurality of interconnected compartments I, II and III. Drive member 14 in the illustrated embodiment is in the form of a disc or plate 32 having a recessed central portion 32a which is provided with one or more apertures 32b. The recessed central portion 32a provides clearance between the disc 32 and the exposed heads of anchor bolts 18 regardless of the axial position of disc 32 with respect to disc 15. The recessed central portion 32a is delimited by a rim portion 32c. Projecting radially from the rim portion 32c are a plurality of symmetrically arranged lugs 33, only one being shown in the drawing. Each lug is disposed within a corresponding pocket 31 formed in the recess RR provided in the surface of unit 26 of drive member 13. As seen in FIG. 3, the width W of the pocket is such that a sliding fit exists between the sides 33a of the lug 33 and the adjacent side walls of the pocket, thus the disc 32 is restrained from rotating relative to drive member 13. The height and depth of the pocket are oversized relative to the lug and thus the height and depth differential forms a passageway Q which communicates at one end with the compartment III of chamber 23 and at the other end with a fluid shear space X. The shear space is formed between the peripheral rim portion 15c of disc 15 and the rim portion 32c of disc 32. When rim portions 15c, 32c are in closest axial proximity to one another, as shown in FIG. 1, maximum clutch action occurs when the space is filled with the viscous fluid F. As the configuration of the space X increases from its configuration shown in FIG. 1, the speed of rotation of drive members 13, 14 relative to member 12 will decrease as the drive member 14 approaches the position shown in FIG. 2 at which point substantially no clutching action results and the drive members 13, 14 remain substantially idle relative to the rotating drive member 12.

While the clutch 10 has heretofore been described wherein member 12 is the driving member and members 13, 14 are the driven members, it is to be understood, of course, that the invention is broad enough to include an arrangement wherein member 13 is the driving member and member 12 is the driven member. Furthermore, the size and shape of the thermal-responsive membrane 27b may vary from that shown. Additional changes in the configuration of the various illustrated components comprising the improved clutch may be made without departing from the scope of the disclosed invention.

We claim:

1. A viscous fluid clutch comprising first and second drive members mounted for rotation about a common axis, said second drive member being provided with an internal chamber for a predetermined volume of viscous fluid, said first drive member being disposed in said chamber; a third drive member disposed within said chamber and intermediate said first drive member and a chamber-forming wall of said second drive member, said third drive member being rotatable as a unit with said second drive member and movable axially independently of said second drive member, corresponding surfaces of said first and third drive members forming therebetween an annular fluid shear space concentric with the rotary axis of said drive members; and a thermal-responsive membrane mounted on and forming a part of said chamber-forming wall of said second drive member and rotatable as a unit with said second and third drive members, said membrane having a segment thereof engagable with said third drive member and independently movable axially of said first drive member in response to predetermined ambient temperature changes, axial movement of said membrane segment effecting corresponding axial movement of said third drive member, and varying the configuration of said shear space; all of said members being adapted to rotate as a unit when said first and third drive members are in closest axial proximity and the annular fluid shear space is substantially filled with the viscous fluid.

2. The clutch of claim 1 wherein said first and third drive members coact to form the chamber of said second drive member into a plurality of interconnected compartments; a first compartment being formed substantially by adjacent portions of said third drive member and the thermal-responsive membrane mounted on said second drive member, a second compartment being formed substantially by adjacent portions of said first and third drive members, said third drive member being provided with at least one fluid port interconnecting said first and second compartments, said second compartment being disposed radially inwardly of the annular fluid shear space, and a third compartment being formed substantially by adjacent portions of said first and second drive members, said third compartment being disposed radially inwardly of the annular fluid shear space, said first drive member being provided with at least one fluid port interconnecting said second and third compartments.

3. The clutch of claim 2 wherein the periphery of said third drive member is provided with a plurality of symmetrically arranged radially extending lugs, each lug being disposed within a corresponding pocket formed in said second drive member, each lug being adapted to coact with a pocket to form a fluid passage interconnecting the annular fluid shear space and the first compartment of said chamber.

4. The clutch of claim 3 wherein opposed side surfaces of each lug slidably contact corresponding surfaces of said pocket preventing relative rotational movement between said second and third drive members.

5. The clutch of claim 1 wherein the axially movable segment of the thermal-responsive membrane has a substantially concavo-convex configuration.

6. The clutch of claim 5 wherein the axially movable segment of the thermal-responsive membrane is a bimetallic dome.

* * * * *